US008922810B2

(12) United States Patent
Kawaura (10) Patent No.: US 8,922,810 B2
(45) Date of Patent: Dec. 30, 2014

(54) INFORMATION PROCESSING APPARATUS AND METHOD FOR DISPLAYING STATUS INFORMATION OF A JOB PRESENT IN A PRINT QUEUE (75) Inventor: Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 12/966,770

(22) Filed: Dec. 13, 2010

(65) Prior Publication Data
US 2011/0149323 A1   Jun. 23, 2011

(30) Foreign Application Priority Data

Dec. 17, 2009   (JP) ................................. 2009-286891

(51) Int. Cl.
*G06F 3/12*   (2006.01)
(52) U.S. Cl.
CPC ............ *G06F 3/1203* (2013.01); *G06F 3/1256* (2013.01); *G06F 3/1207* (2013.01)
USPC .......................... 358/1.15; 358/1.14; 358/527
(58) Field of Classification Search
CPC .... G06F 3/1203; G06F 3/1207; G06F 3/1256
USPC ........................................ 358/527, 1.15, 1.14
See application file for complete search history.

(56) References Cited

U.S. PATENT DOCUMENTS

| 7,693,432 | B2 * | 4/2010 | Belinkov et al. ................ 399/15 |
| 2005/0200879 | A1 * | 9/2005 | Nakagiri et al. ............. 358/1.13 |
| 2006/0001898 | A1 * | 1/2006 | Maeshima et al. ........... 358/1.14 |
| 2006/0023240 | A1 | 2/2006 | Natori |
| 2006/0290963 | A1 * | 12/2006 | Sakuraba et al. ............. 358/1.13 |
| 2007/0201926 | A1 * | 8/2007 | Kato ................................ 400/62 |
| 2008/0098396 | A1 | 4/2008 | Ebuchi |
| 2008/0127307 | A1 * | 5/2008 | Fukuta ............................. 726/3 |
| 2008/0151294 | A1 * | 6/2008 | Natori et al. ................. 358/1.15 |
| 2008/0304095 | A1 * | 12/2008 | Saito ............................. 358/1.14 |
| 2009/0241024 | A1 * | 9/2009 | Shiohara ....................... 715/274 |
| 2010/0002251 | A1 * | 1/2010 | Tachibana .................... 358/1.15 |

FOREIGN PATENT DOCUMENTS

| CN | 1515991 A | 7/2004 |
| EP | 2124143 A2 | 11/2009 |
| JP | 2005-165558 A | 6/2005 |
| JP | 2007-216477 A | 8/2007 |
| JP | 2008-107980 A | 5/2008 |
| JP | 2008-152728 A | 7/2008 |
| JP | 2009-230413 A | 10/2009 |

* cited by examiner

*Primary Examiner* — Benny Q Tieu
*Assistant Examiner* — Quyen V Ngo
(74) *Attorney, Agent, or Firm* — Canon USA Inc. IP Division (57) ABSTRACT

An information processing apparatus provided with a display unit includes a status information display unit configured to display status information of a job present in a print queue via the display unit, an acquisition unit configured to acquire setting information of the job present in the print queue, and a job determination unit configured to determine, based on the setting information acquired by the acquisition unit, whether the job is a job to be output to a printing apparatus. The status information display unit displays, without displaying status information of a job determined not to be output to the printing apparatus by the job determination unit, status information of a job determined to be output to the printing apparatus by the job determination unit via the display unit.

19 Claims, 11 Drawing Sheets

| JOB ID | TOTAL NUMBER OF PAGES | PRINTER OUTPUT |
|---|---|---|
| 25 | 3 | YES |
| 26 | 1 | NO |
| 27 | 5 | YES |
| ... | ... | ... |

501 — JOB ID
502 — TOTAL NUMBER OF PAGES
503 — PRINTER OUTPUT

File

INFORMATION PROCESSING APPARATUS AND METHOD FOR DISPLAYING STATUS INFORMATION OF A JOB PRESENT IN A PRINT QUEUE

BACKGROUND OF THE INVENTION

1. Field of the Invention

The present invention generally relates to information processing and, more particularly, to an information processing apparatus and an information processing method for controlling status displaying of a print job according to presence of an output at a printing apparatus.

2. Description of the Related Art

There has conventionally been provided a technology for appropriately displaying status information of a print job during a period from issuance of a print instruction from an application to completion of printing on a recording medium by a printing apparatus, as discussed in Japanese Patent Application Laid-Open No. 2008-107980. According to the technology discussed in Japanese Patent Application Laid-Open No. 2008-107980, a status monitor continues monitoring of print jobs as long as they are present in a print queue. When processing is started from a standby status and the printing has become in progress (print-in-progress status), a display unit displays the status.

A printer driver that generates and manages print jobs may delete from the print queue a print job set to a print-in-progress status based on print setting set for the print jobs. For example, a preview activation module, which is a module of the printer driver, temporarily deletes the print job at the time of print preview displaying.

A status information display module checks setting of the print job to have become a print-in-progress status, and displays a status information display screen to notify a user of the status of the print job.

For the print job to which displaying of a print preview screen has been set, the status information display screen is displayed since the print job has been set to the print-in-progress status. However, the print job is not output by the printing apparatus, and is deleted from the print queue by the preview activation module during print previewing. Thus, the status information display module immediately deletes the status information display screen that has been displayed.

Thus, when the printer driver processes the print job to which the print preview displaying has been set, the status information display screen is displayed, and then immediately deleted. This results into a possibility that the user may misunderstand that the print job is cancelled even when the print job itself is being previewed.

SUMMARY OF THE INVENTION

According to an aspect of the present invention, an information processing apparatus is provided having a display unit, includes a status information display unit configured to display status information of a job present in a print queue via the display unit, an acquisition unit configured to acquire setting information of the job present in the print queue, and a job determination unit configured to determine, based on the setting information acquired by the acquisition unit, whether the job is a job to be output to a printing apparatus. The status information display unit displays, without displaying status information of a job determined not to be output to the printing apparatus by the job determination unit, status information of a job determined to be output to the printing apparatus by the job determination unit via the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Exemplary embodiments described below are in no way intended to limit the scope of the present invention according to the appended claims. In addition, all the combinations of features of the exemplary embodiments are not essential to solutions provided by the present invention.

Referring to a block diagram of FIG. 1, a configuration of a printing system that includes a printing apparatus (printing apparatus 2) and an information processing apparatus (personal computer 1) connected to the printing apparatus according to an exemplary embodiment will be described.

Figure 1:
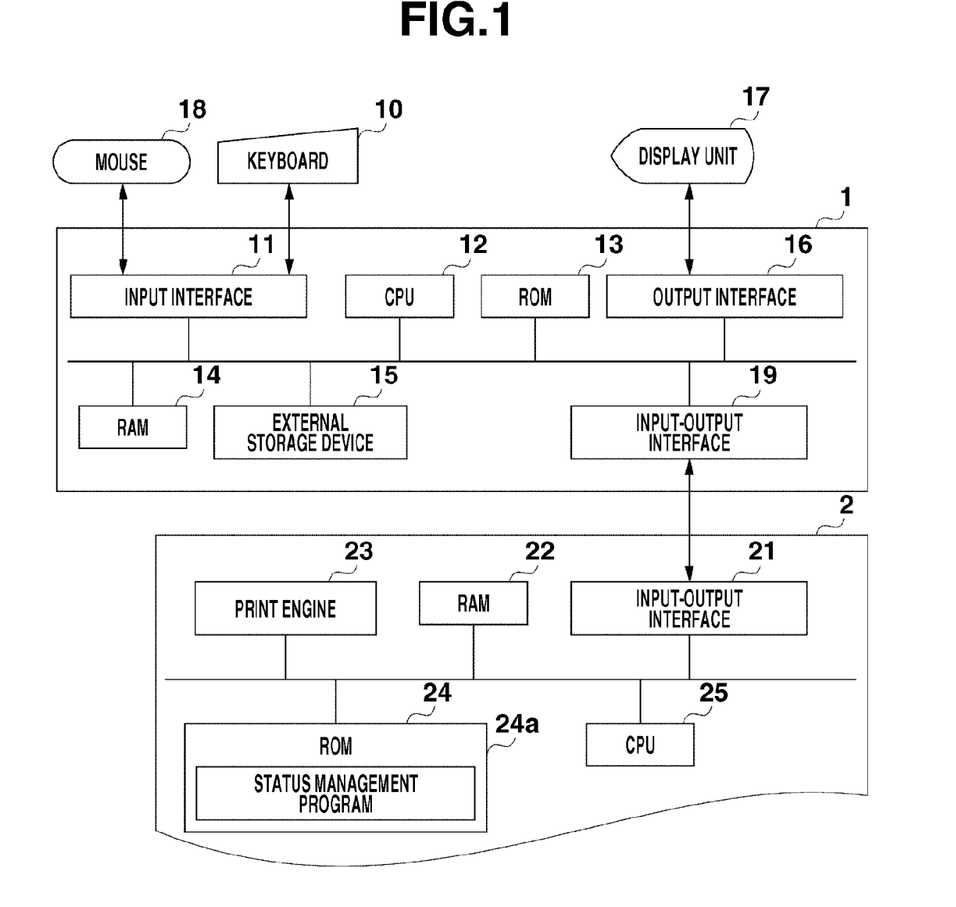
FIG. 1 is a block diagram illustrating a configuration of a printing system that includes a printing apparatus and an information processing apparatus connected to the printing apparatus according to an exemplary embodiment of the present invention.

FIG. 1 illustrates the printing system that includes the printing apparatus 2 and the personal computer 1 connected to the printing apparatus 2 according to the exemplary embodiment of the present invention. The personal computer 1 includes an input interface 11, a central processing unit (CPU) 12, a read-only memory (ROM) 13, a random access memory (RAM) 14, an external storage device 15, an output interface 16, a display unit 17, a keyboard 10, a mouse 18, and an input-output interface 19.

The ROM 13 stores an initialization program. The external storage device 15 stores an application program group, an operating system (OS), a printer driver, and other various data. The RAM 14 is used as a work memory by various programs stored in the external storage device 15.

The printing apparatus 2 includes an input-output interface 21, a RAM 22, a print engine 23, a ROM 24, and a CPU 25. The input-output interface 21 is connected to the input-output interface 19 of the personal computer 1. The present exemplary embodiment is described on the assumption that a connection interface is a universal serial bus (USB). However, any type of a connection interface can be used. An extension option for extending a function of the printing apparatus 2 can be connected to the input-output interface 21.

The RAM 22 is used as a main memory and a work memory for the CPU 25, and stores a reception buffer for temporarily storing a received print job and various data. The print engine 23 performs printing based on the data stored in the RAM 22. The ROM 24 stores various control programs such as a status management program 24a, and data used by each control program. The CPU 25 controls the respective units of the printing apparatus 2 according to the control programs.

The status management program 24a monitors a status of the printing apparatus 2 based on information from various sensors (not illustrated) in the printing apparatus 2, and generates status information and stores it in the RAM 22.

The assigning example of processing tasks to the personal computer 1 and the printing apparatus 2 has been described above. However, the assignment is not limited to this example. Other forms can be employed.

Figure 2:
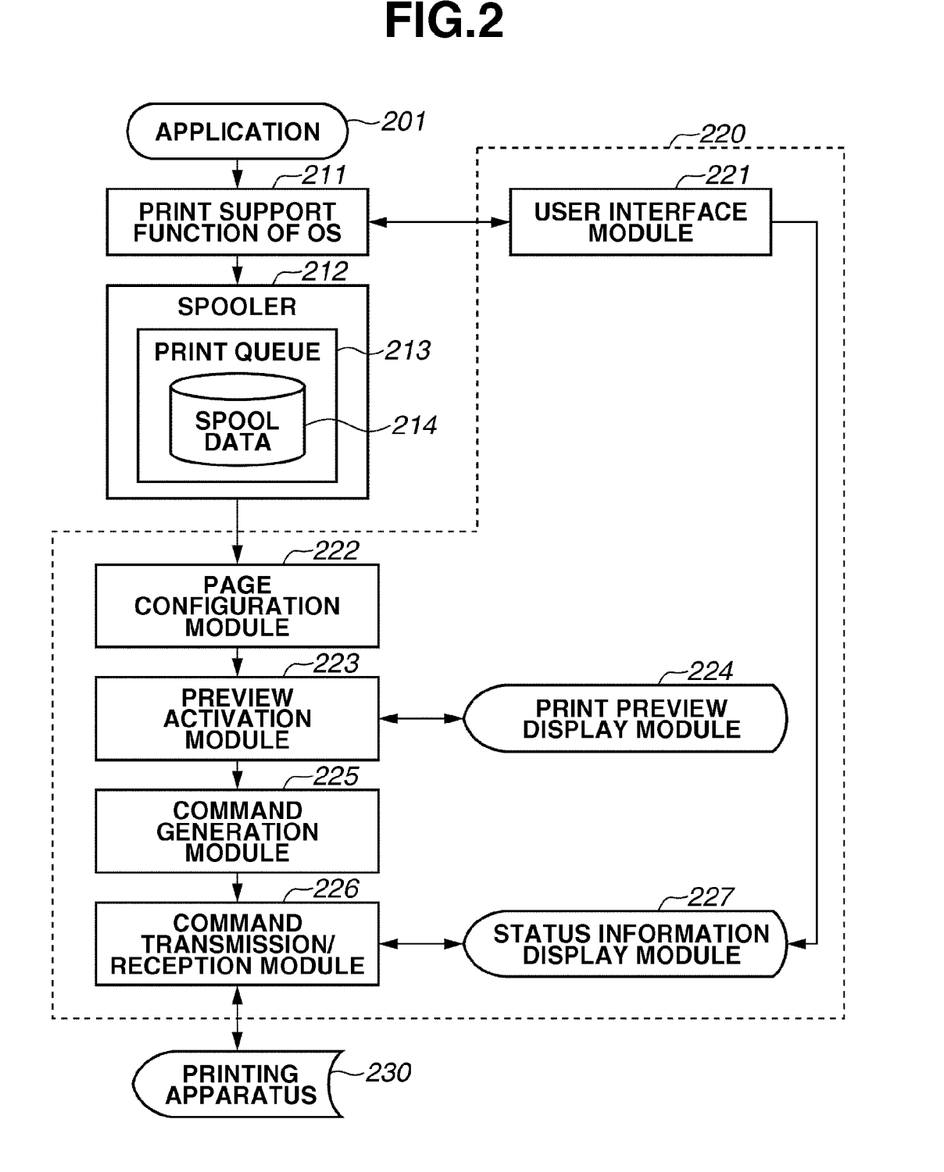
FIG. 2 is a block diagram illustrating a configuration of a printer driver according to an exemplary embodiment of the present invention.

FIG. 2 is a conceptual block diagram mainly illustrating an example of a printer driver 220 to describe a configuration of the printer driver according to the present exemplary embodiment.

Print data generated by an application 201 is temporarily stored as spool data 214 in a print queue 213 of a spooler 212 via a print support function 211 of the OS to be used as a print job. The print job is converted, by the printer driver 220, into a print command that is interpretable by a printing apparatus 230, and is then transmitted to the printing apparatus 230 to be printed.

The application 201 adds, when instructing printing, print setting information returned from a user interface module 221 to the print job via the print support function 211 of the OS. The print setting information is set before the application instructs a start of printing. The user interface module 221 activates a status information display module 227 after receiving a printing start notification from the print support function 211 of the OS.

The print job that has been passed to the printer driver 220 is first processed by a page configuration module 222. The page configuration module 222 performs page configuration processing, such as sorting of pages of the print job or collection of a plurality of pages into one for the print job, according to the print setting information.

The print job is then passed to a preview activation module 223. The preview activation module 223 calls a print preview display module 224 when the print setting information contains an instruction of displaying print preview information.

Figure 6A:
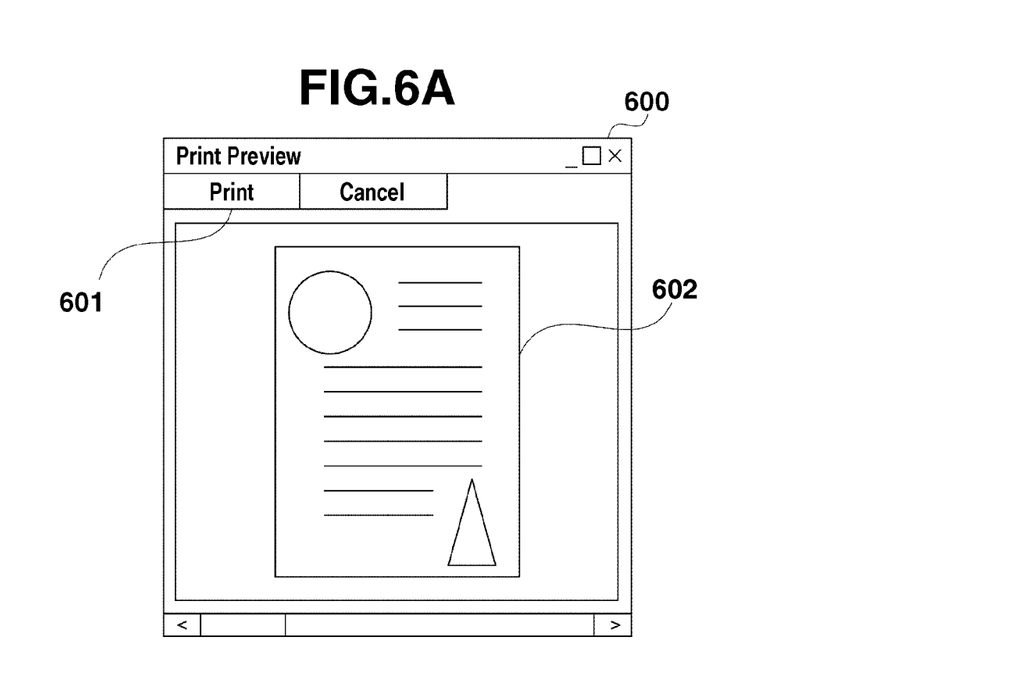
FIGS. 6A to 6C respectively illustrate a print setting screen, a print preview display screen, and a status information display screen according to an exemplary embodiment of the present invention.
Figure 6B:
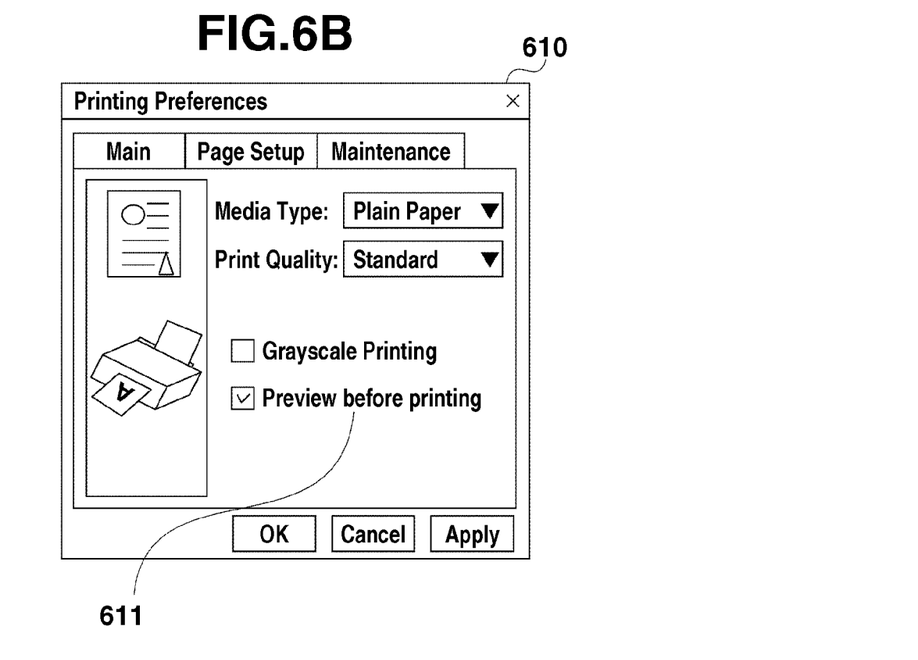
Figure 6C:
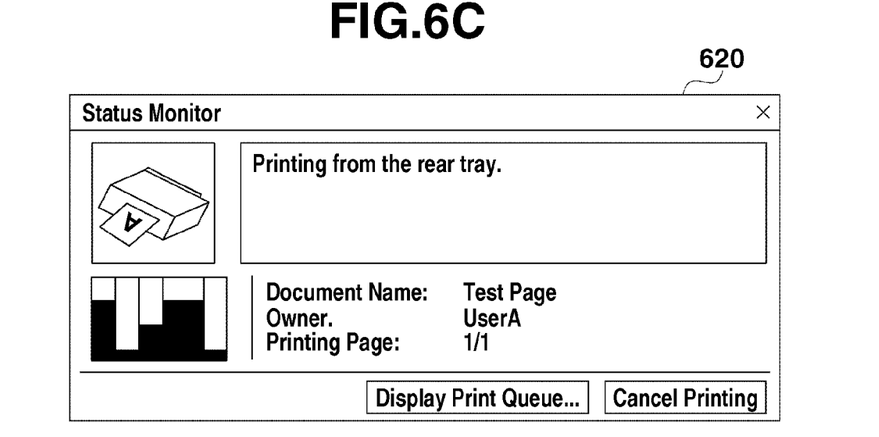

The print preview display module 224 displays a print preview screen illustrated in each of FIGS. 6A to 6C on the display unit 17 of the personal computer so that a user can check a printing result beforehand.

When the print setting information contains no instruction of displaying the print preview information, the preview activation module 223 passes the print job to a command generation module 225. The command generation module 225 converts print data of the print job into a print command that is interpretable by the printing apparatus 230 according to the print setting information. Such print commands are sequentially transmitted to the printing apparatus 230 by a command transmission/reception module 226.

The command transmission/reception module 226 reads a status of the printing apparatus 230 such as information of error generation in the printing apparatus 230 or currently printed page information to pass it to a status information display module 227. The status information display module 227 analyzes the status of the printing apparatus 230, displays information of the printing apparatus 230 on a status information display screen illustrated in each of FIGS. 6A to 6C on the display unit 17 of the personal computer, thereby enabling the user to check a status of the print job or the status of the printing apparatus 230.

According to the present invention, for example, this module performs processing such as job determination as to whether a job is to be output to the printing apparatus, command determination as to whether command transmission has been started, or status determination as to a status of the print queue.

Figure 3:
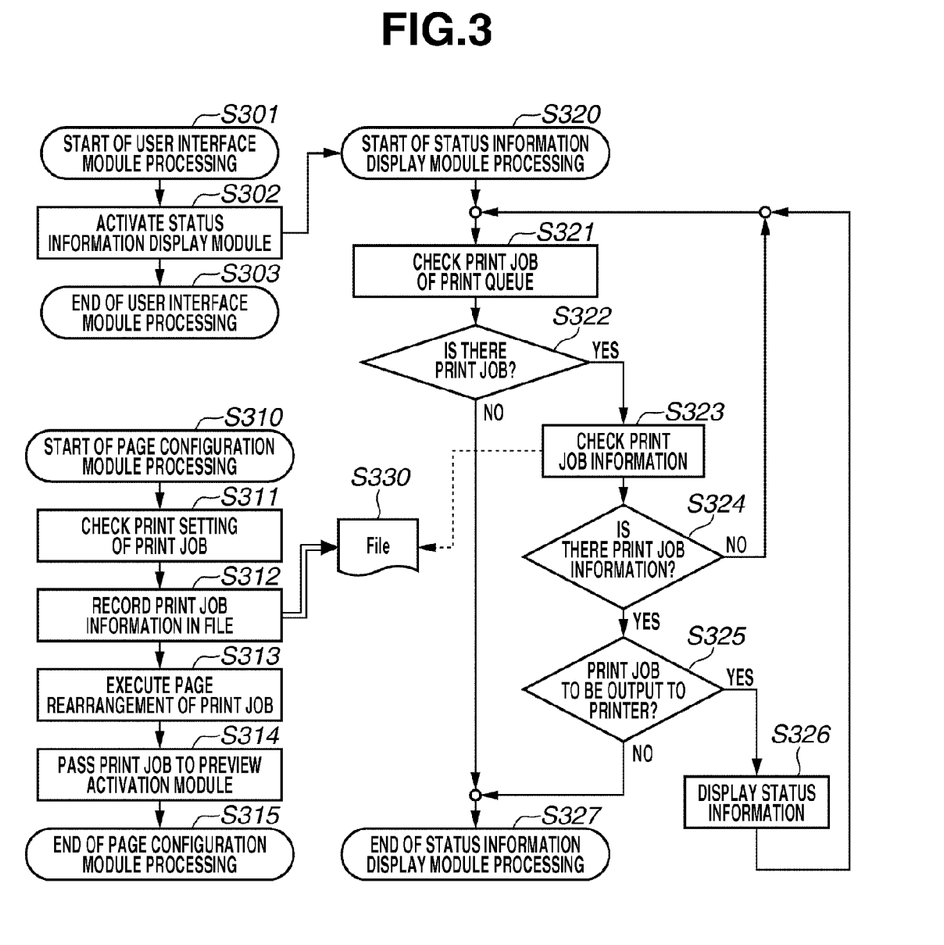
FIG. 3 is a flowchart illustrating processing of each of a user interface module, a page configuration module, and a status information display module according to an exemplary embodiment of the present invention.

Referring to FIGS. 3 to 6C, the first exemplary embodiment of the present invention will be described in detail. FIG. 3 is a flowchart illustrating processing of each of the user interface module, the page configuration module, and the status information display module.

In step S301, the user interface module 221 starts processing after reception of a print start notification from the print support function 211 of the OS. In step S302, the user interface module 221 activates the status information display module 227. In step S303, the user interface module 221 finishes the processing. The processing of the status information display module 227 activated in this processing will be described below.

In step S310, after reception of a print job from the OS, the page configuration module 222 starts processing. In step S311, the page configuration module 222 checks the print job or print setting of the print job. In step S312, the page configuration module 222 records it as print job information in a file.

The print setting of the print job is designated before a printing start from the application 201 on a print setting screen 610 of the user interface module 221 illustrated in FIG. 6B. The print setting screen 610 has a preview display setting place 611 as one of print setting items illustrated in FIG. 6B.

Figure 5:
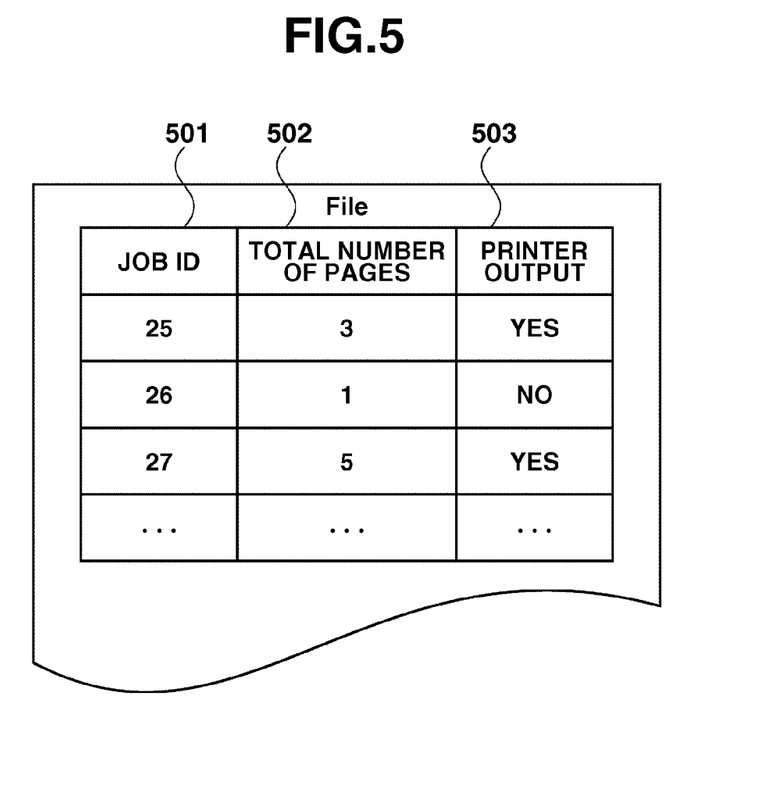
FIG. 5 illustrates print job information to be written in a file by the page configuration module according to an exemplary embodiment of the present invention.

The information recorded in the file 330 includes, as illustrated in FIG. 5, job ID 501, a total number of pages 502, and a printer output 503. The print job information recorded in the file 330 is passed to the status information display module 227. In the present exemplary embodiment, as an inter-process communication method between the modules, file sharing is taken as an example.

During the processing of step S302, the user interface module 221 has received only a job identifier from the OS. Thus, the user interface module 221 cannot accurately acquire print setting of the print job. For example, the user interface module 221 cannot acquire print setting for each page. The print setting of the print job is accordingly fed to the status information display module 227 by the page configuration module 222.

In step S313, after step S312, the page configuration module 222 executes page configuration processing, such as page sorting of the print job. In step S314, the page configuration module 222 passes the print job to the subsequent preview activation module 223. In step S315, the page configuration module 222 finishes the processing.

In step S320, the status information display module 227 activated in step S302 starts processing. In step S321, the status information display module 227 checks print jobs in the print queue. In step S322, the status information display module 227 determines whether there is any print job in the print queue.

When there is no print job (NO in step S322), in step S327, the status information display module 227 finishes the processing. When it is determined that there is a print job (YES in step S322), in step S323, the status information display module 227 checks whether there is a file 330 recording print job information.

In step S324, the status information display module 227 determines whether there is print job information. When there is no print job information (NO in step S324), the processing returns to step S321 to stand by until the page configuration module 222 generates a file 330 that records print job information.

When it is determined that there is print job information (YES in step S324), in step S325, the status information display module 227 determines whether the print job is a print job to be output to the printing apparatus.

When a job being processed is "JOB ID: 26" in the column of the job ID 501 illustrated in FIG. 5, "NO" is written in the column of the printer output 503, and the status information display module 227 determines that the print job is a print job not to be output to the printing apparatus. When it is determined that the print job is a print job not to be output to the printing apparatus (NO in step S325), in step S327, the status information display module 227 finishes the processing.

When the job being processed is "JOB ID: 25" in the column of the job ID 501 illustrated in FIG. 5, "YES" is written in the column of the printer output 503, and the status information display module 227 determines that the print job is a print job to be output to the printing apparatus. When it is determined that the print job is a print job to be output to the printing apparatus (YES in step S325), then in step S326, the status information display module 227 displays a status information screen 620 illustrated in FIG. 6C, and the processing returns to step S321.

After the command transmission/reception module 226 has transmitted the print command to the printing apparatus, and has confirmed the completion of the printing at the printing apparatus, the print job is deleted from the print queue 213. When the status information display module 227 determines that there is no print job in the print queue 213 (NO in step S322), then in step S327, the processing is terminated. Thus, information of the print job can be informed to the user until the printing apparatus 230 completes the printing.

Through the processing described above, in the case of the print job to be output to the printing apparatus, the status information display module 227 displays the status information screen 620. On the other hand, in the case of the print job not to be output to the printing apparatus, the status information display module 227 does not display the status information screen 620. Thus, the status information display module 227 can perform appropriate display determination.

Figure 4:
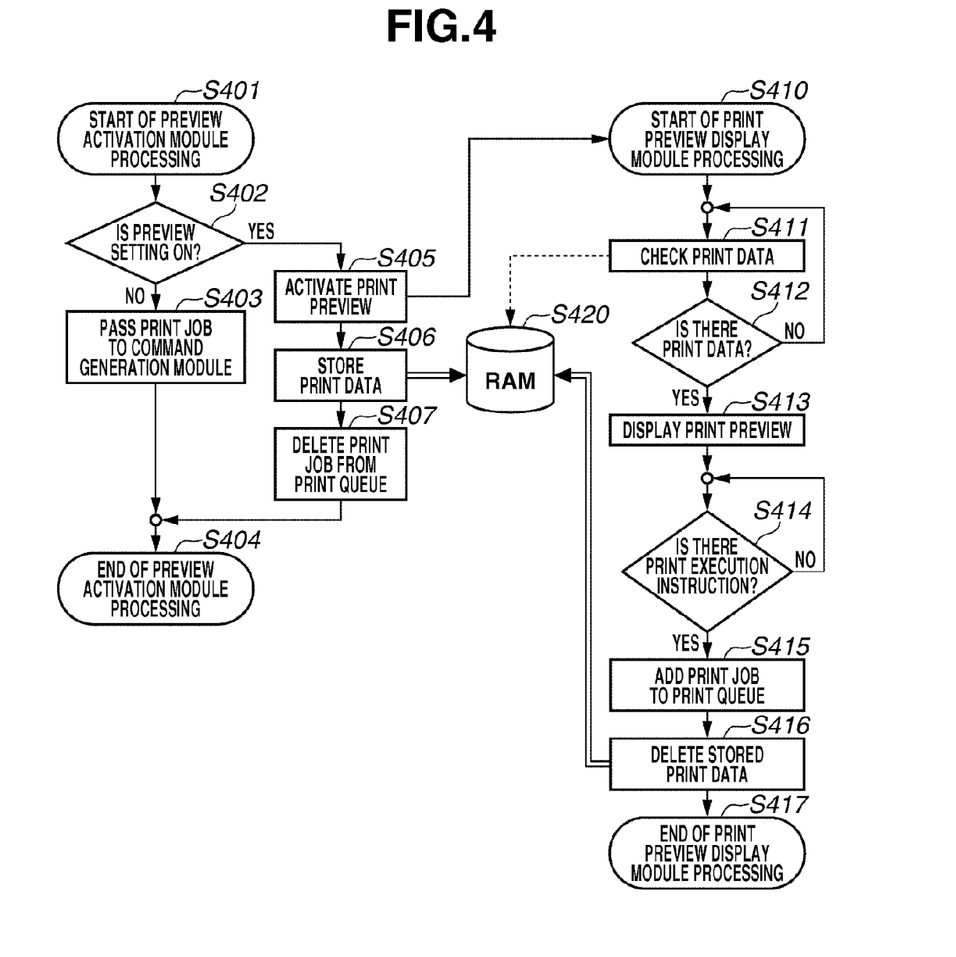
FIG. 4 is a flowchart illustrating processing of each of a preview activation module and a print preview display module according to an exemplary embodiment of the present invention.

FIG. 4 is a flowchart illustrating processing of each of the preview activation module and the print preview display module. Referring to FIG. 4, deletion of the print job from the print queue 213 by the preview activation module 223 when a print preview screen 600 is displayed will be described.

In step S401, after reception of the print job, the preview activation module 223 starts processing. In step S402, the preview activation module 223 checks print setting information of the print job to determine whether there is an instruction of displaying the print preview screen 600.

When it is determined that the print preview screen 600 is not displayed (NO in step S402), in step S403, the preview activation module 223 passes the print job to the command generation module 225. In step S404, the processing is finished. When it is determined that the print preview screen 600 is displayed (YES in step S402), in step S405, the preview activation module 223 activates the print preview screen 600 illustrated in FIG. 6A. Processing of the print preview display module 224 activated in this case will be described below.

In step S406, the preview activation module 223 stores print data of the print job in a RAM 420. The RAM 420 is similar to the RAM 14 illustrated in FIG. 1. In the present exemplary embodiment, the storage of the print data in the RAM 14 is taken as an example. However, the print data can be stored on other storage media. In step S407, the preview activation module 223 deletes the print job from the print queue 213. In step S404, the processing is finished.

Deleting the print job from the print queue 213 by the preview activation module 223 in step S407 enables printing processing of other print jobs not subjected to print previewing even during displaying of a print preview of the print job.

In step S410, the print preview display module 224 activated in step S405 starts processing. In step S411, whether there is print data in the RAM 420 is checked. In step S412, the print preview display module 224 determines whether there is print data in the RAM 420. When there is no print data yet or storage of print data is not completed (NO in step S412), the processing returns to step S411 to stand by until completion of the print data storage.

When it is determined that the storage of the print data in the RAM 420 has been completed (YES in step S412), then in step S413, the print preview display module 224 displays a print preview image 602 illustrated in FIG. 6A.

By setting previewing for a plurality of jobs, the plurality of jobs can be temporarily stored in the RAM and collectively previewed. Data relating to the plurality of jobs being previewed can be combined into one job to be re-input to the print queue.

In step S414, the print preview display module 224 determines whether there is any print execution instruction from the user. When the user presses a print start button 601 illustrated in FIG. 6A, then in step S415, the print preview display module 224 adds print data as a print job to the print queue 213, thereby resuming the printing of the print job for which the preview screen 600 has been displayed. In step S416, the print preview display module 224 deletes the stored print data from the RAM 420. In step S417, the processing is finished.

According to the present exemplary embodiment, the print job input in step S415 is determined to be a job actually output to the printing apparatus. Thus, the job for which previewing is set and which is deleted from the print queue in step S407 is determined to be a job not actually output to the printing apparatus.

In the present exemplary embodiment, the preview activation module 223 is an independent driver configuration module. However, the preview activation module 223 can be included in the page configuration module 222. When the page configuration module 222 includes the preview activation module 223, the print preview display module 224 is called by the page configuration module 222.

Referring to FIGS. 7 to 9B, a second exemplary embodiment of the present invention will be described in detail.

Figure 7:
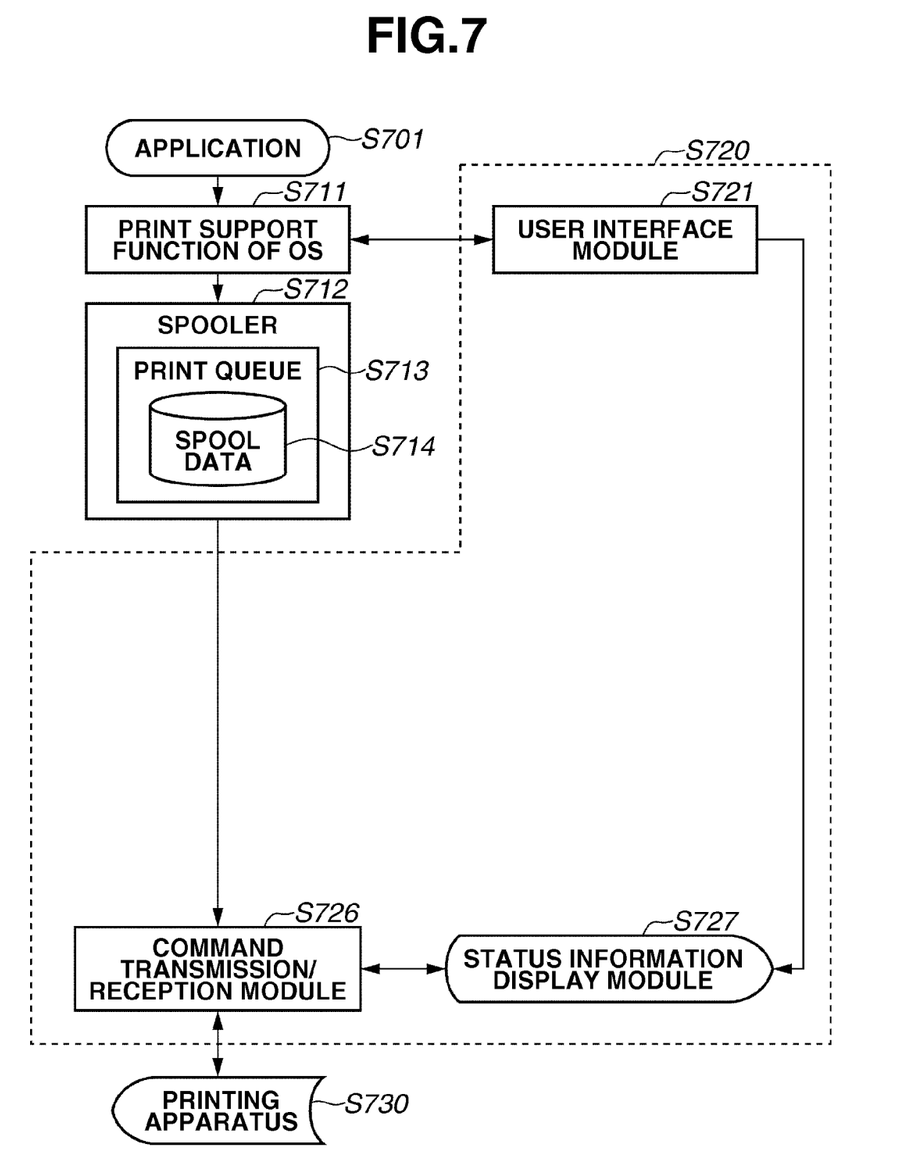
FIG. 7 is a block diagram illustrating a configuration of a printer driver according to an exemplary embodiment of the present invention.

FIG. 7 is a conceptual block diagram mainly illustrating an example of a printer driver 720 to describe a configuration of the printer driver according to the present exemplary embodiment.

Print data generated by an application 701 is temporarily stored as spool data 714 in a print queue 713 of a spooler 712 via a print support function 711 of an OS to be used as a print job.

A normal print job is converted, by a printer driver 720, into a print command that is interpretable by a printing apparatus 730, and then fed to the printing apparatus 730 to be printed. However, there are other types of jobs, such as a cleaning job for instructing cleaning of the printing apparatus 730. The cleaning job is temporarily stored as a print job in the print queue 713 in the form of a print command that is interpretable by the printing apparatus 730.

Special jobs such as a cleaning job different from the normal print jobs have been converted into a print command that is interpretable by the printing apparatus 730. Thus, the page configuration module 222, the preview activation module 223, and the command generation module 225 perform no processing for this special job.

For example, the jobs such as a cleaning job are sequentially transmitted to the printing apparatus 730 by a command transmission/reception module 726. The printing apparatus 730 performs cleaning based on a received cleaning job command. In the execution of the cleaning job, the print support function 711 of the OS notifies a user interface module 721 of a start of printing.

The user interface module 721 that has been notified of the start of printing calls a status information display module 727. The command transmission/reception command 725 reads a status of the printing apparatus 730, such as information on an error generated in the printing apparatus 730, and passes it to the status information display module 727.

The status information module 727 analyzes the status of the printing apparatus 730, and displays the information of the printing apparatus 730 on the display unit 17 of the personal computer, thereby enabling the user to check the status of the printing apparatus 730.

The status information display module 727 checks, in the file 330 recording the print job information illustrated in FIG. 3, that a job is a print job to be output to the printing apparatus 730, and then displays a status information display screen 620.

Figure 8:
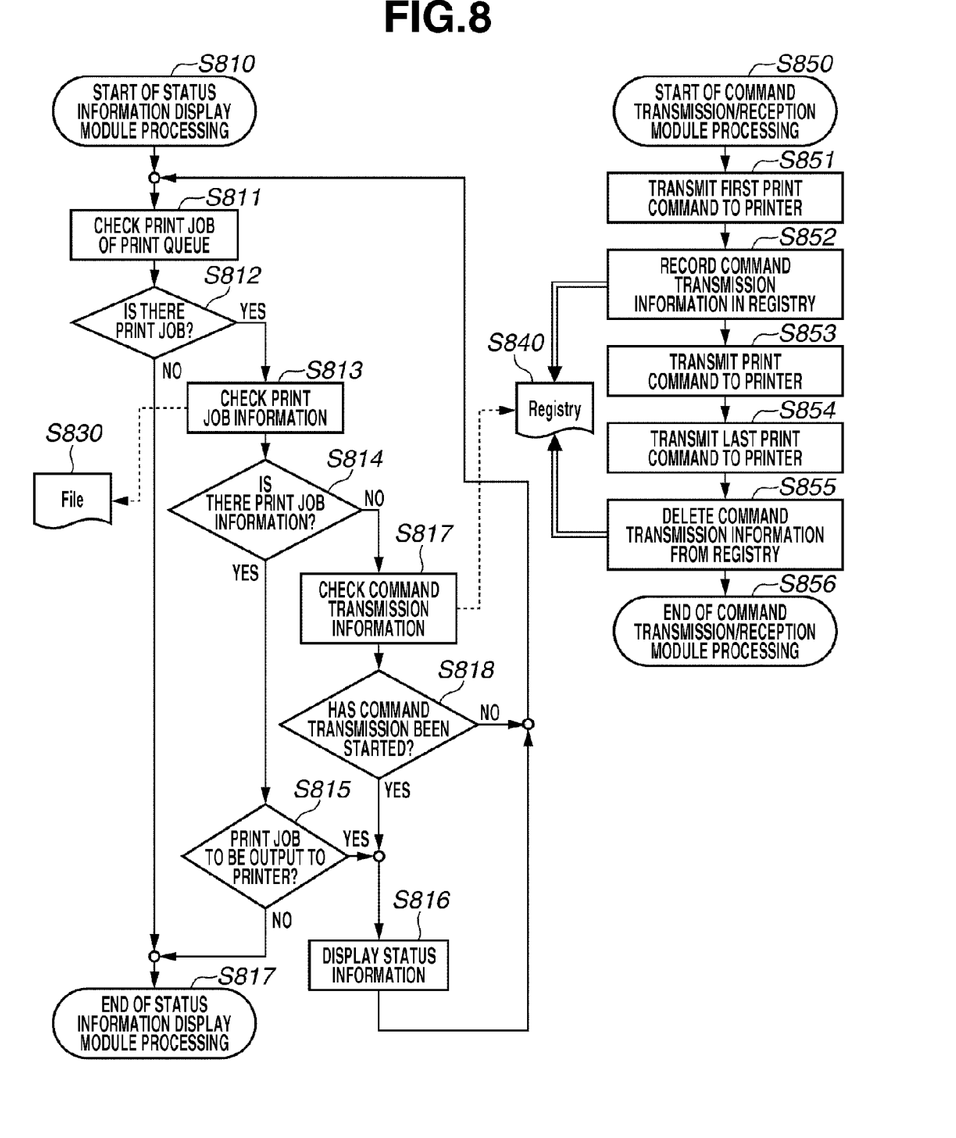
FIG. 8 is a flowchart illustrating processing of each of a status information display module and a command transmission/reception module according to an exemplary embodiment of the present invention.

However, the page configuration module 222 performs no processing for the special job, and hence the file 330 cannot be fed. This disables the status information display module 727 from displaying the status information display screen 620. Referring to FIG. 8, a method for solving this problem will be described.

FIG. 8 is a flowchart illustrating processing of each of the status information display module and the command transmission/reception module. In the present exemplary embodiment, an example is described, which is based on the assumption that a job registered as a print job in the print queue is a special job (cleaning job).

In step S810, the status information display module 727 activated by the user interface module 721 starts processing. In step S811, the status information display module 727 checks print jobs in the print queue 713. In step S812, the status information display module 727 determines whether there is any print job. When there is no print job (NO in step S812), in step S817, the processing is finished. When it is determined that there is a print job (YES in step S812), in step S813, the status information display module 727 checks whether there is a file 830 recording print job information. The file 830 recording the print job information is similar to the file 330 illustrated in FIG. 3.

In step S814, the status information display module 727 determines whether there is print job information. As described above, no file 830 is generated in the cleaning job. When there is no print job information (NO in step S814), in step S817, the status information display module 727 checks whether there is command transmission information 840 in a registry.

The command transmission information 840 is generated by the command transmission/reception module 726, which will be described below. In step S818, the status information display module 727 determines, based on the command transmission information 840, whether the command transmission/reception module 726 has started command transmission to the printing apparatus 730.

When it is determined that the command transmission has been started (YES in step S818), in step S816, the status information display module 727 displays the status information display screen 620. More specifically, even in a case of a print job such as the cleaning job on which the page configuration module 222 performs no processing, when the command transmission/reception module 726 has started the command transmission to the printing apparatus 730, the status information display module 727 displays the status information display screen 620.

When the status information display module 727 determines that the command transmission has not been started (NO in step S818), the processing returns to step S811. As a result, a status in which the status information display screen 620 is not displayed continues.

In a case of the normal print job, the page configuration module 222 performs processing on the job, and hence a file 830 is generated by the page configuration module 222. Thus, the status information display module 727 determines that there is print job information (YES in step S814). In step S815, the status information display module 727 determines whether the print job is a print job to be output to the printing apparatus.

When it is determined that the print job is a print job to be output to the printing apparatus (YES in step S815), in step S816, the status information display module 727 displays the status information display screen 620. When it is determined that the print job is not a print job to be output to the printing apparatus (NO in step S815), in step S817, the status information display module 727 finishes the processing.

Processing of the command transmission/reception module 726 will be described. In step S850, the command transmission/reception module 726 starts processing after reception of print commands. In step S851, the command transmission/reception module 726 transmits a first print command to the printing apparatus 730. In step S852, the command transmission/reception module 726 writes the command transmission information 840 in the registry.

In step S853, the command transmission/reception module 726 sequentially transmits the subsequent print commands to the printing apparatus 730. In step S854, the command transmission/reception module 726 transmits a last print command to the printing apparatus 730. In step S855, the command transmission information 840 written in the registry is returned to its initial value. In step S856, the processing is finished.

Figure 9A:
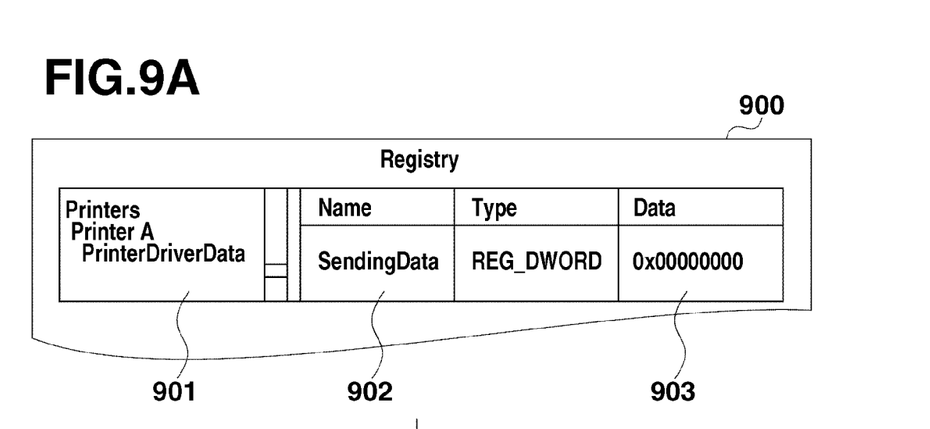
FIGS. 9A and 9B illustrate command transmission information to be written in a registry by the command transmission/reception module according to an exemplary embodiment of the present invention.

FIG. 9A illustrates an initial status of the command transmission information 840 in a registry 900. In the registry 900, data 903 of "0x00000000" is written in a registry value 902 of "SendingData" of a registry key 901 of "PrinterDriverData". The data 903 of "0x00000000" indicates a status that the command transmission/reception module 726 has not started command transmission.

Figure 9B:
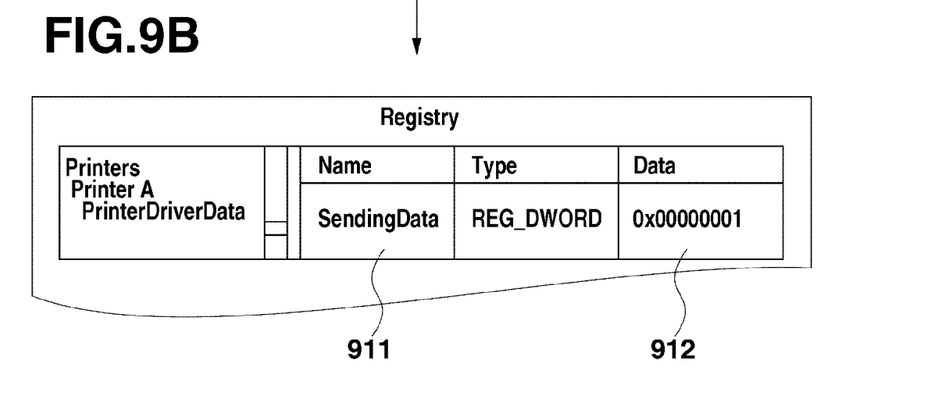

FIG. 9B illustrates a status of the registry where the command transmission/reception module 726 has written a start of command transmission to the printing apparatus 730 in step S852.

Data 912 of "0x00000001" is written in a registry value 911 of "SendingData". This indicates that the command transmission/reception module 726 has started command transmission. After reading of the status of "0x00000001", in step S818, the status information display module 727 determines that the command transmission/reception module has started command transmission to the printing apparatus 730.

After the transmission of the last print command to the printing apparatus in step S854, the command transmission/reception module 726 returns the command transmission information 840 in the registry to the initial value "0x00000000" indicated by the data 903.

Through the processing, even in a case of the data that is not processed by the page configuration module 222, whether the status information display screen 620 is displayed can be appropriately determined. In the present exemplary embodiment, the cleaning job has been described as the example of the job not processed by the page configuration module 222. However, the present invention is applicable to other special jobs that are not processed by the page configuration module 222.

Figure 10:
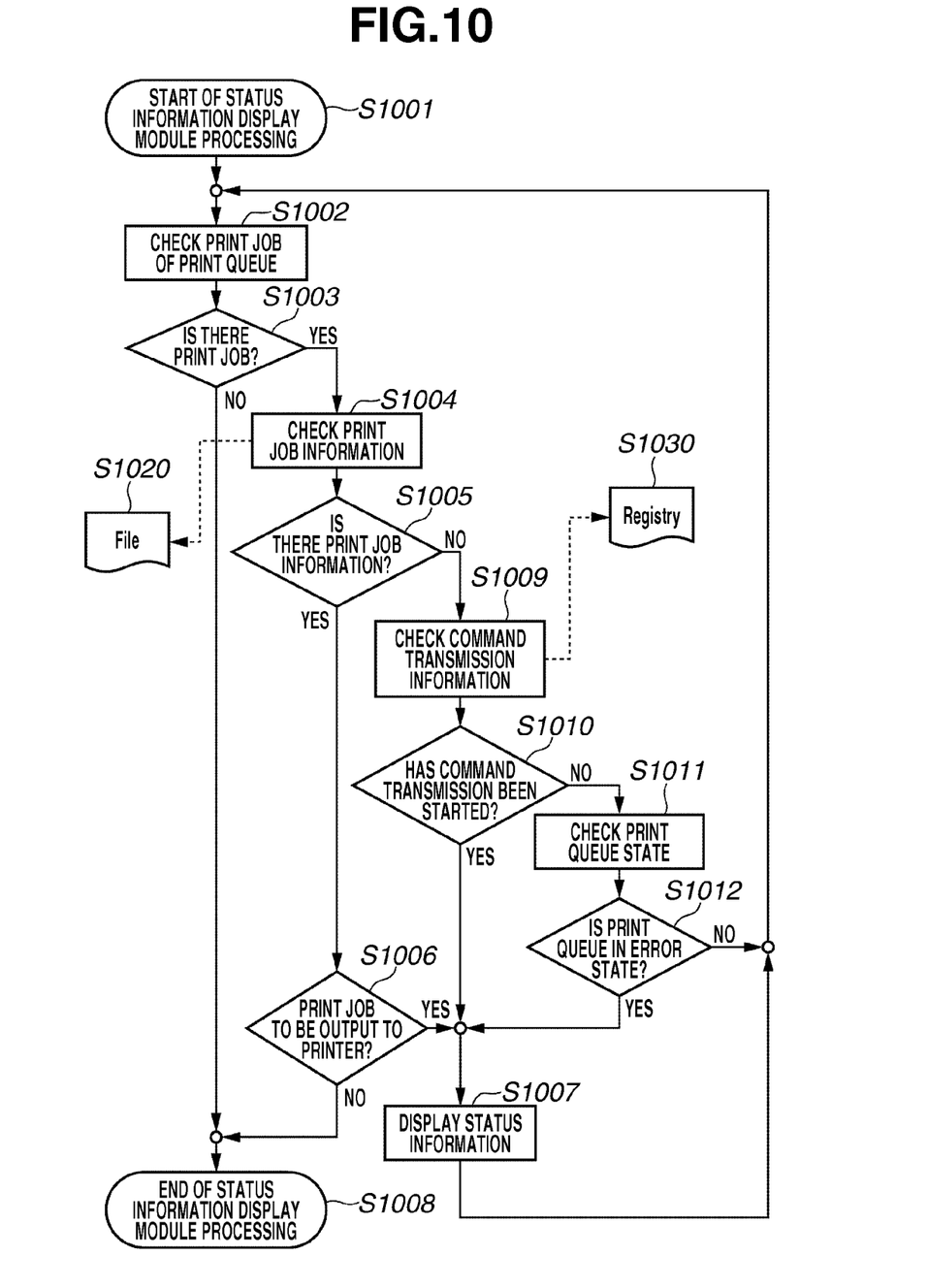
FIG. 10 is a flowchart illustrating processing of the status information display module according to an exemplary embodiment of the present invention.

Referring to FIG. 10, a third exemplary embodiment of the present invention will be described.

The spooler 212 does not pass any temporarily stored print job when an error generated in the printing apparatus 230 connected to web services on devices (WSD) is detected. In this case, the status information display module 227 cannot check the print job information 330 or the print command transmission information 840, and hence the status information display screen 620 cannot be displayed. Referring to FIG. 10, a method for solving this problem will be described.

FIG. 10 is a flowchart illustrating processing of the status information display module 227.

In step S1001, the status information display module 227 activated by the user interface module 221 starts processing. In step S1002, the status information display module 227 checks print jobs in the print queue.

In step S1003, the status information display module 227 determines whether there is any print job. When there is no print job (NO in step S1003), then in step S1008 the processing is finished. When it is determined that there is a print job (YES in step S1003), in step S1004, the status information display module 227 checks whether there is a file 1020 recording print job information. The file 1020 recording the print job information is similar to the file 330 illustrated in FIG. 3.

In step S1005, the status information display module 227 determines whether there is print job information. When it is determined that there is print job information (YES in step S1005), in step S1006, the status information display module 227 determines whether the print job is a print job to be output to the printing apparatus.

When it is determined that the print job is a print job to be output to the printing apparatus (YES in step S1006), in step S1007, the status information display module 227 displays the status information display screen 620. When the status information display module 227 determines that the print job is not a print job to be output to the printing apparatus (NO in step S1006), in step S1008, the processing is finished.

On the other hand, when it is determined that there is no print job information (NO in step S1005), in step S1009, the status information display module 227 checks whether there is command transmission information 1030 in the registry. The command transmission information 1030 is similar to the command transmission information 840 illustrated in FIG. 8.

In step S1010, the status information display module 227 determines, based on the command transmission information 1030, whether the command transmission/reception module 226 has started command transmission to the printing apparatus 230. When it is determined that the command transmission has been started (YES in step S1010), in step S1007, the status information display module 227 displays the status information display screen 620.

When it is determined that the command transmission has not been started (NO in step S1010), in step S1011, the status information display module 227 checks a status of the print queue 213. The status information display module 227 acquires the status of the print queue 213 by using an application programming interface (API).

In step S1012, the status information display module 227 determines whether the status of the print queue 213 indicates an error generated in the printing apparatus 230. The status indicating the error generated in the printing apparatus 230 is, for example, "DOOR OPEN" or "NO TONER".

When the status information display module 227 determines that no error has been generated in the printing apparatus 230 (NO in step S1012), the processing returns to step S1002 to continue the state where the status information display screen 620 is not displayed.

When it is determined that an error has been generated in the printing apparatus 230 (YES in step S1012), in step S1007, the status information display module 227 displays the status information display screen 620. In this case, the status information display module 227 instructs the command transmission/reception module 226 to acquire a status of the printing apparatus 230, and displays the error information in the printing apparatus 230 on the status information display screen 620 in detail.

As described above, even in the case of the printing apparatus 230 connected to the WSD and in an error state, the status information display module 227 can appropriately display the status information display screen 620.

Aspects of the present invention can also be realized by a computer of a system or apparatus (or devices such as a CPU, a micro-processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-286891 filed Dec. 17, 2009, which is hereby incorporated by reference herein in its entirety.

What is claimed is:

1. An information processing apparatus including a display unit, the apparatus comprising:
a status information display unit configured to display status information of a job present in a print queue via the display unit, wherein the job present in the print queue is generated in the information processing apparatus;
a page configuration unit configured to perform page configuration processing based on setting information of the job present in the print queue, and record the setting information of the job in a file;
an acquisition unit configured to acquire the setting information of the job from the file corresponding to the job present in the print queue; and
a job determination unit configured to determine, based on the setting information acquired by the acquisition unit, whether the job present in the print queue is a job to be output to a printing apparatus,
wherein the status information display unit displays, without displaying status information of a job determined not to be output to the printing apparatus by the job determination unit, status information of a job determined to be output to the printing apparatus by the job determination unit via the display unit.

2. The information processing apparatus according to claim 1, further comprising a previewing unit configured to delete, when execution of previewing of the job is set as setting information of the job, the job from the print queue, and execute the previewing of the job via the display unit,
wherein the job determination unit determines that the job is not output to the printing apparatus when the execution of the previewing of the job is set as the setting information acquired by the acquisition unit.

3. The information processing apparatus according to claim 1, further comprising a command determination unit configured to determine whether transmission of a command regarding the job to the printing apparatus has been started,
wherein the status information display unit displays, when the acquisition unit acquires no setting information of the job present in the print queue, the status information of the job via the display unit according to determination of the command determination unit that the transmission of the command regarding the job has been started.

4. The information processing apparatus according to claim 3, wherein the page configuration unit is configured to perform, before transmission of the print job present in the print queue to the printing apparatus, page configuration processing based on the setting information of the job, and record the setting information of the job,
wherein a case where the acquisition unit acquires no setting information of the job present in the print queue means that the job present in the print queue is a special job that is not processed by the page configuration unit, and
wherein the status information display unit displays, when the acquisition unit acquires no setting information of the special job present in the print queue, the status information of the job via the display unit according to the determination of the command determination unit that the transmission of the command regarding the job has been started.

5. The information processing apparatus according to claim 4, wherein the status information display unit and the page configuration unit are provided by a printer driver operating in the information processing apparatus.

6. The information processing apparatus according to claim 4, wherein the special job is a cleaning job.

7. The information processing apparatus according to claim 3, further comprising a command transmission unit configured to transmit the command regarding the job present in the print queue to the printing apparatus,
wherein the command determination unit acquires information regarding whether the command transmission unit has started the transmission of the command.

8. The information processing apparatus according to claim 7, wherein the status information display unit and the command transmission unit are provided by a printer driver operating in the information processing apparatus.

9. The information processing apparatus according to claim 1, further comprising a status determination unit configured to acquire a status of the print queue to determine that a status of the print queue is an error status,
wherein the status information display unit displays, when the acquisition unit acquires no setting information of a special job present in the print queue, the status information of the job via the display unit according to determination of the status determination unit that the status of the print queue is the error status.

10. The information processing apparatus according to claim 9, wherein the status determination unit determines that the status of the print queue is the error status when an error generated in the printing apparatus is informed in the print queue.

11. An information processing method in an information processing apparatus including a display unit, the method comprising:
displaying status information of a job present in a print queue via the display unit, wherein the job present in the print queue is generated in the information processing apparatus;
performing page configuration processing based on setting information of the job present in the print queue, and recording the setting information of the job in a file;
acquiring the setting information of the job from the file corresponding to the job present in the print queue; and
determining, based on the acquired setting information, whether the job present in the print queue is a job to be output to a printing apparatus,
wherein while status information of a job that is determined not to be output to the printing apparatus is not displayed, status information of a job that is determined to be output to the printing apparatus is displayed via the display unit.

12. The information processing method according to claim 11, further comprising deleting, when execution of previewing of a job is set as setting information of the job, the job from the print queue, and executing the previewing of the job via the display unit,
wherein the job is determined not to be output to the printing apparatus when the execution of the previewing of the job is set as the acquired setting information.

13. The information processing method according to claim 11, further comprising determining whether transmission of a command regarding the job to the printing apparatus has been started,
wherein when no setting information of the job present in the print queue is acquired, the status information of the job is displayed via the display unit according to determination that the transmission of the command regarding the job has been started.

14. The information processing method according to claim 13, wherein the performing performs, before transmission of the print job present in the print queue to the printing apparatus, page configuration processing based on the setting information of the job, and recording the acquired setting information of the job, wherein the case where no setting information of the job present in the print queue is acquired means that the job present in the print queue is a special job that is not processed during the page configuration processing, and wherein when no setting information of the special job present in the print queue is acquired, the status information of the job is displayed via the display unit according to the determination that the transmission of the command regarding the job has been started.

15. The information processing method according to claim 14, wherein the special job is a cleaning job.

16. The information processing method according to claim 13, further comprising transmitting the command regarding the job present in the print queue to the printing apparatus, wherein information regarding whether the transmission of the command has been started is acquired to make determination.

17. The information processing method according to claim 11, further comprising acquiring a status of the print queue to determine that the status of the print queue is an error status, wherein when no setting information of a special job present in the print queue is acquired, the status information of the job is displayed via the display unit according to determination that the status of the print queue is the error status.

18. The information processing method according to claim 17, wherein the status of the print queue is determined to be the error status when an error generated in the printing apparatus is informed in the print queue.

19. A non-transitory computer readable storage medium that stores a computer program for making a computer execute a method for an information processing apparatus including a display unit, the method comprising:

displaying status information of a job present in a print queue via the display unit, wherein the job present in the print queue is generated in the information processing apparatus;

performing page configuration processing based on setting information of the job present in the print queue, and recording the setting information of the job in a file;

acquiring the setting information of the job from the file corresponding to the job present in the print queue; and determining, based on the acquired setting information, whether the job present in the print queue is a job to be output to a printing apparatus, wherein while status information of a job that is determined not to be output to the printing apparatus is not displayed, status information of a job that is determined to be output to the printing apparatus is displayed via the display unit.

* * * * *